Patented Sept. 27, 1938

2,131,244

UNITED STATES PATENT OFFICE 2,131,244

VULCANIZATION OF RUBBER

Ira Williams, Woodstown, N. J., assignor to E. I. du Pont de Nemours & Company, Wilmington, Del., a corporation of Delaware No Drawing. Application January 11, 1934, Serial No. 706,258

25 Claims. (Cl. 18—53)

This invention relates to the vulcanization of rubber and more particularly to methods of accelerating such vulcanization.

The acceleration of vulcanization is old in the art and a large number of materials are available for use as accelerators. These materials fall roughly under the following classes.

1. Inorganic accelerators such as lime, litharge and caustic soda.
2. Moderately strong organic bases such as alkyl amines, guanidines, aryl amines, quinine, and piperidine.
3. Aldehyde amine reaction products such as acetaldehyde ammonia, hexamethylenetetramine, formaldehyde p-toluidine and butyraldehyde aniline.
4. Dithio acid, xanthic acid and dithio carbamic acid derivatives, such as salts or esters of dithio fluoric acid, ethyl xanthic acid, dimethyl ammonium dithio carbamic acid, or the sulfides of the above acids such as tetra methyl thiuram sulfide or thio ureas such as diphenyl thio urea.
5. Thiazoles such as mercapto benzo thiazole and derivatives of thiazoles such as metallic salts and dinitro phenyl benzo thiazl sulfide.

Some of these compounds have proved to be very successful in practice. However, many of them are objectionable due to their strong basic or strong acidic properties. Some give objectionable odors to the products and some are toxic.

An object of the present invention is to provide a new class of accelerators which are easily prepared, inexpensive and which are essentially neutral in character. A further object of this invention is to provide a method for improving the vulcanization of rubber. Other objects are to provide new compositions of matter and to advance the art. Still other objects will appear hereinafter.

The objects of my invention may be accomplished by incorporating in a rubber mix, prior to vulcanization, a compound of the type represented by the formula:

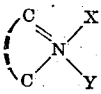

in which the nitrogen is a member of a heterocyclic ring and can be represented as being doubly bonded to one carbon, X is an anion and Y is organic in nature and has a carbon atom directly connected to the nitrogen. Preferably the nitrogen forms part of a heterocyclic ring in which the other members of the ring consist of carbon atoms. Also, preferably, Y represents a hydrocarbon radicle. This type of compound is described in Berichte 13, 2045, 16, 1278 and 19, 2363. Generally, these compounds are prepared by reacting the cyclic nitrogen compound directly with esters or organic halides. Among the compounds of my invention which I have found to be particularly satisfactory for my purpose are:

Benzyl pyridine chloride,
Ethyl pyridine chloride,
Benzyl isoquinoline chloride,
Benzyl pyridine thio ethylate,
Benzyl pyridine tartrate,
Ethyl pyridine tartrate,
Methyl pyridine formate,
Benzyl pyridine ethyl trithio carbonate.

In order to more clearly illustrate my invention the following examples are given:

Example 1

79 parts of pyridine was mixed with 126 parts of benzyl chloride and the temperature increased to 150° C. for an hour. The resulting product, when first cooled, is a red amber colored liquid which crystallizes after standing several days. This benzyl pyridine chloride accelerates strongly.

Example 2

Ethyl pyridine chloride is prepared by reacting equal molecular proportions of pyridine and ethyl chloride under pressure. This product is an effective accelerator for the vulcanization of rubber.

Example 3

Two molar proportions of ethyl pyridine chloride were dissolved in alcohol. One molar proportion of sodium tartrate was dissolved in a small amount of water at 80° C. The water and alcohol solutions were mixed and stirred together at 60° C. for an hour. The sodium chloride which precipitated was filtered off and the ethyl pyridine tartrate was recovered by evaporation as a dark semi-solid.

Example 4

One molar proportion of pyridine and one molar proportion of methyl formate were heated for 8 hours at 250° C. The methyl pyridine formate was recovered as a dark oil by distilling off the small amount of unreacted material under reduced pressure.

Example 5

129 parts of iso quinoline and 126 parts of benzyl chloride were heated together for an hour at 160° C. The resulting benzyl isoquinoline chloride is a viscous red oil.

Example 6

One molecular proportion of benzyl pyridine chloride was added to a solution of one molecular proportion of sodium ethyl mercaptide in absolute alcohol. The sodium chloride which precipitated was filtered off and the alcohol evaporated from the filtrate at reduced pressure. The resulting benzyl pyridine thio ethylate was a dark viscous oil.

Example 7

One molecular proportion of benzyl pyridine thioethylate, dissolved in alcohol, was treated with one molecular proportion of carbon disulfide. After standing five hours, the alcohol was evaporated. The resulting benzyl pyridine ethyl trithiocarbonate remained as a dark tar.

The following table illustrates the use of these materials as accelerators of vulcanization. The test formula consists of 100 parts of smoked sheet rubber, 5 parts zinc oxide, 25 parts carbon black, 3 parts of sulfur, 1 part of stearic acid and 1.5 parts of accelerator. Vulcanization was carried out at 287° F.

| | Load at 500% elongation in #/in² | | | Tensile at break #/in² | | |
|---|---|---|---|---|---|---|
| Cure in minutes | 20 | 30 | 60 | 20 | 30 | 60 |
| Accelerator: | | | | | | |
| Benzyl pyridine chloride | 2,300 | 2,375 | 2,500 | 4,200 | 3,775 | 3,525 |
| Ethyl pyridine tartrate | 2,275 | 2,425 | 2,575 | 3,800 | 3,800 | 2,000 |
| Methyl pyridine formate | 1,425 | 1,750 | 2,125 | 2,225 | 3,075 | 3,475 |
| Benzyl isoquinoline chloride | 1,525 | 1,750 | 2,125 | 3,275 | 3,400 | 3,750 |

The above examples and tests are given for illustrative purposes only and indicate the general methods of preparing my compounds and the advantageous results to be obtained by the use thereof.

Among the other compounds falling within my invention and which have been tested and found to be valuable accelerators for the vulcanization of rubber, the following may be mentioned.

Ethyl pyridine ethyl carbonate,
Ethyl pyridine ethyl dithio carbonate,
Butyl pyridine amyl trithio carbonate,
Benzyl pyridine ethyl monothio carbonate,
Ethyl pyridine thiocyanate,
Ethyl pyridine thio amylate,
Ethyl pyridine thio ethylate,
Ethyl pyridine ethylate,
Ethyl pyridine tri thio carbonate,
Ethyl pyridine ethyl xanthate,
Ethyl pyridine hydrosulfide,
Ethyl pyridine sulfide,
Ethyl pyridine di thio propionate,
Ethyl pyridine thio sulfate,
Ethyl pyridine thio phenylate,
Ethyl pyridine hydroxide,
Ethyl pyridine methyl xanthate,
Ethyl pyridine methylate,
Ethyl pyridine methyl carbonate,
Ethyl pyridine ethyl monothio carbonate,
Benzyl pyridine ethyl mercaptide,
Benzyl pyridine hydrosulfide,
Benzyl pyridine sulfide,
Benzyl pyridine tri thio carbonate,
Benzyl pyridine di thio propionate,
Benzyl pyridine thio sulfate,
Benzyl pyridine methyl xanthate,
Benzyl pyridine methyl carbonate,
Benzyl pyridine phthalate,
Benzyl pyridine borate,
Benzyl pyridine nitrite,
Benzyl pyridine polysulfide,
Phenyl pyridine chloride.

Also two molecular proportions of pyridine were reacted with one molecular proportion of phosgene and the resulting product was then reacted with two molecular proportions of mercapto benzothiazole to produce an accelerator having the probable formula:

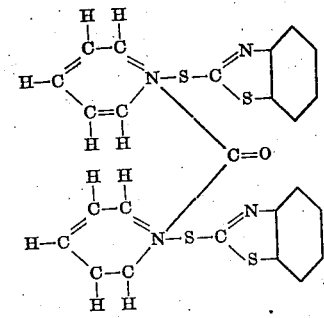

Among the cyclic nitrogen compounds which may be represented by the formula

and which may be employed to produce my new type of vulcanization accelerators are: pyridine, picolines, collidines, lutidines, quinolines, isoquinolines, and other cyclic nitrogen compounds which are sufficiently basic to form addition compounds with methyl iodide. Also, the cyclic nitrogen compounds may contain other substituents such as the halogens, and nitro, amino, aryl, aralkyl, alkyl, alkoxy and aryloxy groups.

Some of the salt forming anions which may be represented by X in my formula are chlorine, bromine, iodine, sulfate, thio sulfate, nitrate, acetate, formate, tartrate, thiocyanate, hydroxyl, sulfur, mercapto, carbonates, monothiocarbonates, dithio carbonates, trithiocarbonates, dithiocarbamates, phthalate, borate, nitrite, polysulfide and thiazyl mecaptides.

Other salt forming anions represented by X in my formula are those represented by —O—R₁ and —S—R₁ wherein R₁ represents an organic radical having a carbon atom directly bonded to the O or S. The radical —O—R₁ may represent alkoxy or aryloxy groups such as methoxy, ethoxy, butoxy, phenoxy, naphthoxy and their homologues and isomers. The radical —O—R₁ may also represent the alkyl, aralkyl and aryl carbonates and thiocarbonates which have the formula

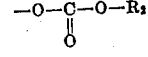

and

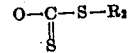

wherein R₂ represents an alkyl, aralkyl or aryl radical such as methyl, ethyl, propyl, benzyl, phenyl, naphthyl and the like. The radical —S—R₁ may represent thio alkylates or arylates such as thio methylate, thio ethylate, thio butylate, thio phenylate, thio naphthylate and their homologues and isomers. Further, the radical —S—R₁ may represent the alkyl, aralkyl and aryl mono- and tri-thio carbonates having the formula

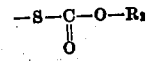

and

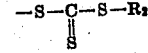

wherein R₂ represents an alkyl, aralkyl or aryl radical such as methyl, ethyl, propyl, butyl, amyl, benzyl, phenyl, naphthyl and their various homologues and isomers.

Some of the organic radicals which may be represented by Y in my formula are methyl, ethyl, propyl, isopropyl, butyl, amyl, vinyl, allyl, crotyl, lauryl, benzyl, toluyl, zylyl, phenyl, naphthyl, dinitro phenyl, dinitro naphthyl and 9-10-dihydroanthraquinyl.

While I have disclosed the preferred embodiments of my invention, it will be readily apparent to those skilled in the art that many variations and modifications may be made therein particularly in the compositions and proportions of parts without departing from the spirit of my invention, accordingly, the scope of my invention is to be limited solely by the appended claims construed as broadly as is permissible in view of the prior art.

I claim:

1. The method of vulcanizing rubber which comprises incorporating in a rubber mix, prior to vulcanization, a compound of the type:

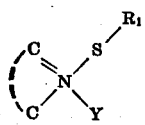

wherein N is part of a heterocyclic ring, $R_1$ represents hydrocarbon radical having a carbon atom directly bonded to the S and Y is an organic radical having a carbon atom directly connected to N.

2. Rubber having incorporated therein as a vulcanization accelerator, a compound of the type:

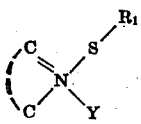

wherein N is part of a heterocyclic ring, $R_1$ represents hydrocarbon radical having a carbon atom directly bonded to the S and Y is an organic radical having a carbon atom directly connected to N.

3. The method of vulcanizing rubber which comprises incorporating in a rubber mix, prior to vulcanization, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by a salt forming anion derived from a compound of the group consisting of inorganic acids, thio alkylates, thio phenols, dithiocarbamic acid, organic carboxylic acids, organic thiocarbonic acids, alcohols, phenols, and organic xanthic acids.

4. The method of vulcanizing rubber which comprises incorporating in a rubber mix, prior to vulcanization, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an oxygen containing salt forming anion in which the oxygen is directly bonded to the nitrogen.

5. The method of vulcanizing rubber which comprises incorporating in a rubber mix, prior to vulcanization, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an oxygen containing organic salt forming anion in which the oxygen is directly bonded to the nitrogen.

6. The method of vulcanizing rubber which comprises incorporating in a rubber mix, prior to vulcanization, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an organic carboxylic acid radical.

7. The method of vulcanizing rubber which comprises incorporating in a rubber mix, prior to vulcanization, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an aliphatic carboxylic acid radical.

8. The method of vulcanizing rubber which comprises incorporating in a rubber mix, prior to vulcanization, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by a tartaric acid radical.

9. The method of vulcanizing rubber which comprises incorporating in a rubber mix, prior to vulcanization, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an inorganic acid radical.

10. The method of vulcanizing rubber which comprises incorporating in a rubber mix, prior to vulcanization, a quaternary ammonium salt in which the pentavalent nitrogen forms part of a pyridine nucleus and in which a fourth valence of the pentavalent nitrogen is satisfied by a carbon of a distinct organic radical and the fifth valence is satisfied by an oxygen containing salt forming anion in which the oxygen is directly bonded to the nitrogen.

11. The method of vulcanizing rubber which comprises incorporating in a rubber mix, prior to vulcanization, a quaternary ammonium salt in which the pentavalent nitrogen forms part of a pyridine nucleus and in which a fourth valence of the pentavalent nitrogen is satisfied by a carbon of a distinct organic hydrocarbon radical and the fifth valence is satisfied by an oxygen containing salt forming anion in which the oxygen is directly bonded to the nitrogen.

12. The method of vulcanizing rubber which comprises incorporating in a rubber mix, prior to vulcanization, a quaternary ammonium salt in which the pentavalent nitrogen forms part of a pyridine nucleus and in which a fourth valence of the pentavalent nitrogen is satisfied by a carbon of a distinct aliphatic radical and the fifth valence is satisfied by an oxygen containing salt forming anion in which the oxygen is directly bonded to the nitrogen.

13. The method of vulcanizing rubber which comprises incorporating in a rubber mix, prior to vulcanization, a quaternary ammonium salt in which the pentavalent nitrogen forms part of a pyridine nucleus and in which a fourth valence of the pentavalent nitrogen is satisfied by a carbon of a distinct aliphatic hydrocarbon radical and the fifth valence is satisfied by an oxygen containing salt forming anion in which the oxygen is directly bonded to the nitrogen.

14. The method of vulcanizing rubber which comprises incorporating in a rubber mix, prior to vulcanization, a quaternary ammonium salt derived from pyridine in which the pentavalent nitrogen forms part of the pyridine ring and in which a fourth valence of the pentavalent nitrogen is satisfied by a carbon of a distinct organic radical and the fifth valence is satisfied by an oxygen containing salt forming anion in which the oxygen is directly bonded to the nitrogen.

15. Rubber having incorporated therein as a vulcanization accelerator, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by a salt forming anion derived from a compound of the group consisting of inorganic acids, thio alkylates, thio phenols, dithiocarbamic acid, organic carboxylic acids, organic thiocarbonic acids, alcohols, phenols, and organic xanthic acids.

16. Rubber having incorporated therein as a vulcanization accelerator, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an oxygen containing salt forming anion in which the oxygen is directly bonded to the nitrogen.

17. Rubber having incorporated therein as a vulcanization accelerator, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an oxygen containing organic salt forming anion in which the oxygen is directly bonded to the nitrogen.

18. Rubber having incorporated therein as a vulcanization accelerator, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an organic carboxylic acid radical.

19. Rubber having incorporated therein as a vulcanization accelerator, a quaternary ammonium salt in which the pentavalent nitrogen is part of an unsaturated heterocyclic ring, two valences of the nitrogen being satisfied by a single carbon of the ring, a third valence of the nitrogen being satisfied by another carbon of the ring, a fourth valence of the nitrogen being satisfied by a carbon of a distinct organic radical and the remaining valence being satisfied by an inorganic acid radical.

20. Rubber having incorporated therein as a vulcanization accelerator, a quaternary ammonium salt in which the pentavalent nitrogen forms part of a pyridine nucleus and in which a fourth valence of the pentavalent nitrogen is satisfied by a carbon of a distinct organic radical and the fifth valence is satisfied by an oxygen containing salt forming anion in which the oxygen is directly bonded to the nitrogen.

21. Rubber having incorporated therein as a vulcanization accelerator, a quaternary ammonium salt in which the pentavalent nitrogen forms part of a pyridine nucleus and in which a fourth valence of the pentavalent nitrogen is satisfied by a carbon of a distinct organic hydrocarbon radical and the fifth valence is satisfied by an oxygen containing salt forming anion in which the oxygen is directly bonded to the nitrogen.

22. Rubber having incorporated therein as a vulcanization accelerator, a quaternary ammonium salt in which the pentavalent nitrogen forms part of a pyridine nucleus and in which a fourth valence of the pentavalent nitrogen is satisfied by a carbon of a distinct aliphatic hydrocarbon radical and the fifth valence is satisfied by an oxygen containing salt forming anion in which the oxygen is directly bonded to the nitrogen.

23. Rubber having incorporated therein as a vulcanization accelerator, a quaternary ammonium salt derived from pyridine in which the pentavalent nitrogen forms part of the pyridine ring and in which a fourth valence of the pentavalent nitrogen is satisfied by a carbon of a distinct organic radical and the fifth valence is satisfied by an oxygen containing salt forming anion in which the oxygen is directly bonded to the nitrogen.

24. The method of vulcanizing rubber which comprises incorporating in a rubber mix, prior to vulcanization, ethyl pyridine tartrate.

25. Rubber, having incorporated therein as a vulcanization accelerator, ethyl pyridine tartrate.

IRA WILLIAMS.